United States Patent
Nagaprakash et al.

(10) Patent No.: US 11,575,572 B2
(45) Date of Patent: Feb. 7, 2023

(54) NETWORK CONTROLLER HORIZONTAL SCALING FOR NETWORK DEVICE CONFIGURATION SESSIONS MANAGEMENT

(71) Applicant: Juniper Networks, Inc., Sunnyvale, CA (US)

(72) Inventors: Madhura Mysore Nagaprakash, Bengaluru (IN); Patricio Giecco, Upland, CA (US); Shivaprasad Gali, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/305,110

(22) Filed: Jun. 30, 2021

(65) Prior Publication Data
US 2022/0329486 A1   Oct. 13, 2022

(30) Foreign Application Priority Data
Apr. 13, 2021   (IN) .............................. 202141017207

(51) Int. Cl.
*H04L 45/02* (2022.01)
*H04L 45/122* (2022.01)
(Continued)

(52) U.S. Cl.
CPC ...... *H04L 41/0816* (2013.01); *H04L 41/0886* (2013.01); *H04L 43/0811* (2013.01)

(58) Field of Classification Search
CPC ............. H04L 41/0816; H04L 41/0886; H04L 43/0811
See application file for complete search history.

(56) References Cited

U.S. PATENT DOCUMENTS 8,693,374 B1   4/2014   Murphy et al.
9,450,817 B1   9/2016   Bahadur et al.
(Continued)

OTHER PUBLICATIONS

Filsfils et al., "Segment Routing Architecture," Internet Engineering Task Force (IETF), RFC 8402, Jul. 2018, 33 pp.
(Continued)

*Primary Examiner* — Christopher B Robinson
(74) *Attorney, Agent, or Firm* — Shumaker & Sieffert, P.A.

(57) ABSTRACT

A first plurality of network configuration controllers of a controller may distribute, using a consistent hashing algorithm, a plurality of connection sessions with a plurality of network devices among the plurality of network configuration controllers. The controller may monitor a number of connection sessions maintained by each of the first plurality of network configuration controllers. The controller may add, based on monitoring the number of connection sessions maintained by each of the first plurality of network configuration controllers, an additional network configuration controller to the first plurality of network configuration controllers to form a second plurality of network configuration controllers. The second plurality of network configuration controllers may, in response to adding the additional network configuration controller to the first plurality of network configuration controllers, re-distribute, using the consistent hashing algorithm, one or more connection sessions of the plurality of connection sessions among the second plurality of network configuration controllers.

16 Claims, 5 Drawing Sheets

(51) Int. Cl.
*H04L 45/18* (2022.01)
*H04L 41/0816* (2022.01)
*H04L 43/0811* (2022.01)
*H04L 41/08* (2022.01)

(56) References Cited

U.S. PATENT DOCUMENTS

| | | | | |
|---|---|---|---|---|
| 2009/0138608 | A1* | 5/2009 | Arroyo | H04L 67/141 |
| | | | | 709/228 |
| 2009/0245183 | A1* | 10/2009 | Baker | H04L 67/1008 |
| | | | | 370/329 |
| 2013/0329584 | A1* | 12/2013 | Ghose | H04L 49/356 |
| | | | | 370/252 |
| 2014/0112132 | A1* | 4/2014 | Muthuswamy | H04L 63/00 |
| | | | | 370/230 |
| 2014/0325228 | A1* | 10/2014 | Roitshtein | H04L 9/0643 |
| | | | | 713/171 |
| 2015/0019680 | A1* | 1/2015 | Darcy | H04L 67/1097 |
| | | | | 709/214 |
| 2015/0327024 | A1* | 11/2015 | Yang | H04W 4/06 |
| | | | | 370/312 |
| 2017/0161109 | A1* | 6/2017 | Khojastepour | G06F 9/5083 |
| 2017/0177266 | A1* | 6/2017 | Doerner | G06F 3/0689 |
| 2019/0075012 | A1 | 3/2019 | Shen et al. | |
| 2020/0295998 | A1 | 9/2020 | Ranjbar et al. | |
| 2020/0314004 | A1* | 10/2020 | Rashad | H04L 41/12 |
| 2020/0314188 | A1* | 10/2020 | Bowden | H04L 69/327 |
| 2020/0389360 | A1* | 12/2020 | Boucadair | H04L 69/325 |

OTHER PUBLICATIONS

Filsfils and Sivabalan et al., "Segment Routing Policy Architecture," SPRING Working Group, Ver. 6, Dec. 14, 2019, 36 pp.

Filsfils and Talaulikar et al., "SR Policy Implementation and Deployment Considerations," SPRING Working Group, Ver. 4, Oct. 9, 2019, 24 pp.

Filsfils and Michielson, "SR Traffic-Engineering," Cisco Systems, Mar. 2017, 186 pp.

U.S. Appl. No. 17/194,104, filed Mar. 5, 2021, naming inventors Sidebottom et al.

Extended Search Report from counterpart European Application No. 22167966.5 dated Jul. 20, 2022, 11 pp.

Wu et al., "Towards Distributed SDN: Mobility Management and Flow Scheduling in Software Defined Urban IoT", IEEE Transactions on Parallel and Distributed Systems, vol. 31, No. 06, IEEE, Nov. 2018, pp. 1400-1418.

* cited by examiner

NETWORK CONTROLLER HORIZONTAL SCALING FOR NETWORK DEVICE CONFIGURATION SESSIONS MANAGEMENT

This application claims the benefit of Indian Provisional Patent Application No. 202141017207, filed 13 Apr. 2021, the entire contents of which is incorporated herein by reference.

TECHNICAL FIELD

The disclosure relates to computer networks and, more specifically, to automated horizontal scaling of network configuration controllers.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks use label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop), or swap the labels and perform other MPLS operations to forward the MPLS packets along the established path. In some examples, the Network Configuration Protocol (NETCONF) is a network management protocol that can be used to maintain active and persistent NETCONF sessions with computing devices in a computer network to provision and manage routing paths, such as LSPs.

SUMMARY

In general, techniques are described for automated horizontal scaling of network configuration controllers, such as NETCONF controllers, in order for the network configuration controllers to be able to seamlessly maintain active and persistent connections with a large number of network devices (e.g., over 200 thousand devices) in a network, such as a fifth generation (5G) broadband mobile network.

For example, a controller may provision multiple instances of a network configuration controller that may each be assigned to a non-overlapping portion of the network devices in the network. The controller may assign each of the network devices to a network configuration controller using a consistent hashing technique. The controller may also determine whether to perform horizontal scaling of the network configuration controllers to add a network configuration controller to the multiple network configuration controllers by determining the number of connections maintained by each of the network configuration controllers and comparing the number of connections maintained by each of the network configuration controllers to the maximum number of connections that can be maintained by each of the network configuration controllers. The controller may, in response to adding a network configuration controller to the multiple network configuration controllers, use the consistent hashing technique to redistribute the connections maintained by the network configuration controllers to the network devices.

In one aspect, a method includes distributing, by a first plurality of network configuration controllers of a controller and using a consistent hashing algorithm, a plurality of connection sessions with a plurality of network devices among the first plurality of network configuration controllers; monitoring, by the controller, a number of connection sessions maintained by each of the first plurality of network configuration controllers; adding, by the controller and based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distributing, by the second plurality of network configuration controllers and using the consistent hashing algorithm, one or more connection sessions of the plurality of connection sessions among the second plurality of network configuration controllers.

In another aspect, a computing device includes a memory; and processing circuitry in communication with the memory, the processing circuitry and memory being configured to: distribute, by a first plurality of network configuration controllers of the computing device and using a consistent hashing algorithm, a plurality of connection sessions with a plurality of network devices among the first plurality of network configuration controllers; monitor a number of connection sessions maintained by each of the first plurality of network configuration controllers; add, based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

In another aspect, a non-transitory computer-readable storage medium encoded with instructions that, when executed, cause one or more programmable processors to: distribute, by a first plurality of network configuration controllers of the computing device and using a consistent hashing algorithm, a plurality of connection sessions with a plurality of network devices among the first plurality of network configuration controllers; monitor a number of connection sessions maintained by each of the first plurality of network configuration controllers; add, based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

In another aspect, a controller includes a memory; and processing circuitry in communication with the memory, the processing circuitry and memory being configured to: distribute, by a first plurality of network configuration controllers of the controller and using a consistent hashing algorithm, a plurality of connection sessions with a plurality of network devices among the first plurality of network configuration controllers; monitor a number of connection sessions maintained by each of the first plurality of network configuration controllers; add, based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

In another aspect, a computing device comprises means for distributing, using a consistent hashing algorithm, a plurality of connection sessions with a plurality of network devices among a first plurality of network configuration controllers; means for monitoring a number of connection sessions maintained by each of the first plurality of network configuration controllers; means for adding, based on monitoring the number of connection sessions maintained by each of the first plurality of network configuration controllers, an additional network configuration controller to the first plurality of network configuration controllers to form a second plurality of network configuration controllers; and means for, in response to adding the additional network configuration controller to the first plurality of network configuration controllers, re-distributing, using the consistent hashing algorithm, one or more connection sessions of the plurality of connection sessions among the second plurality of network configuration controllers.

The details of the techniques are set forth in the accompanying drawings and the description below. Other features, objects, and advantages of the techniques will be apparent from the description and drawings, and from the claims.

DETAILED DESCRIPTION

Figure 1:
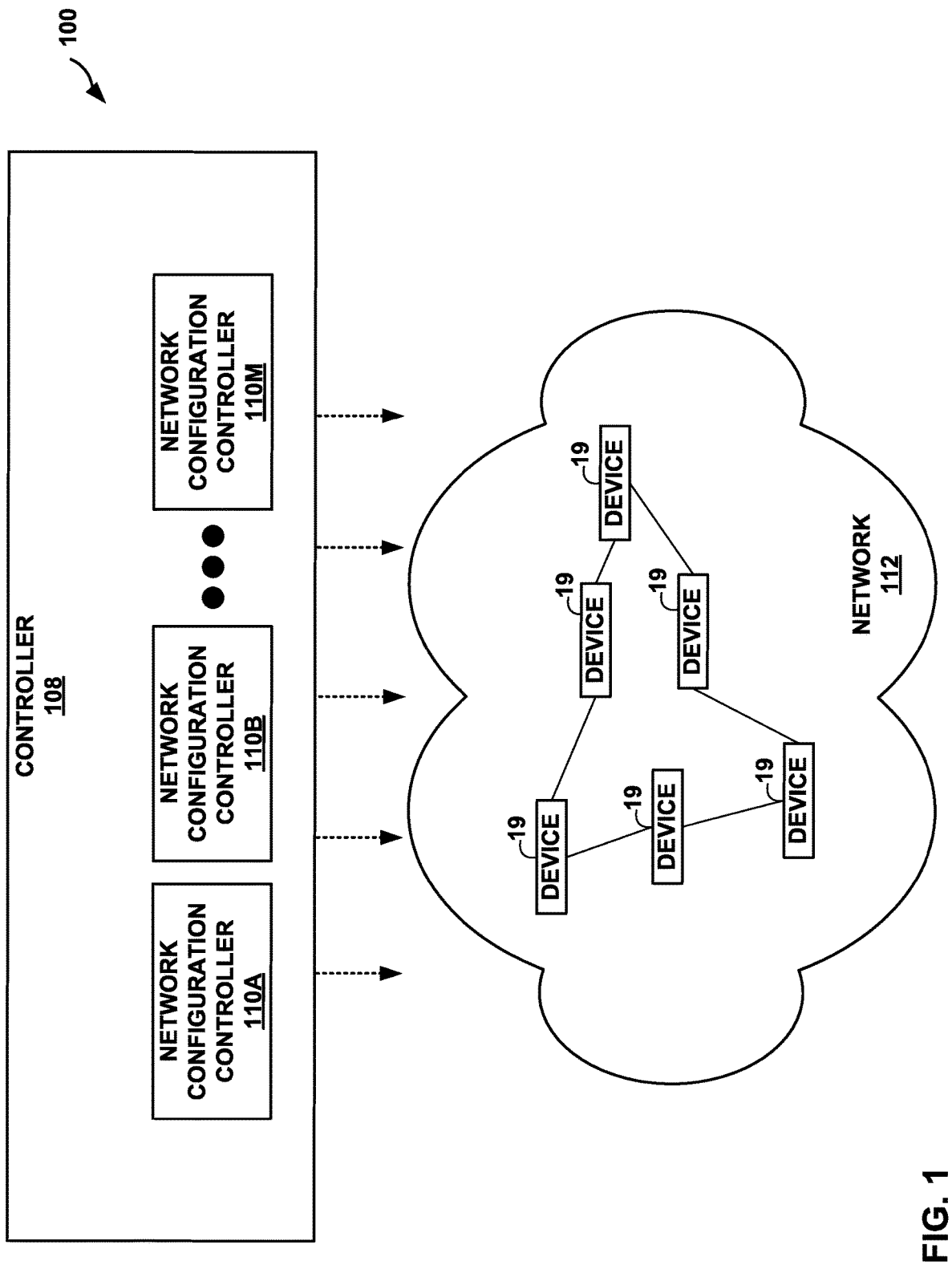
FIG. 1 is a block diagram illustrating an example system, having a network and a controller, and configured to operate in accordance with techniques described in this disclosure.

FIG. 1 is a block diagram illustrating an example system 100 having network 112 and controller 108 configured to operate in accordance with techniques described in this disclosure. Network 112 may include one or more computer networks (e.g., a set of interconnected L2/L3 networks) and, in some examples, may be a wide area network. Examples of network 112 may include one or more autonomous systems, data centers, branch offices, private network, public networks, cloud networks, or other types of networks. In some examples, network 112 may be a broadband mobile network, such as a fifth generation (5G) cellular network. Network 112 includes any number of devices 19 that communicate either directly or indirectly with each other via network 112. Each of devices 19 may represent a router, a switch, or other network device. Devices 19 may be able to forward packets of packet flows from sources to destinations along routing paths according to techniques such as Label Switched Path (LSP).

Controller 108 may include one or more computing devices that represent a WAN controller and may maintain active and persistent sessions with devices 19 using Network Configuration Protocol (NETCONF), Path Computation Element Communication Protocol (PCEP), BGP, or other protocols to provision and manage LSPs, such as NETCONF-based LSPs, in network 112. For example, controller 108 includes multiple instances of network configuration controllers 110A-110M (hereafter "network configuration controllers 110") for configuring devices 19 to provision and manage LSPs in network 112 using, for example, NETCONF. Each of network configuration controllers 110 may be responsible for maintaining a persistent connection with a non-overlapping portion of devices 19 in network 112, so that devices 19 in network 112 may be divided between network configuration controllers 110.

Controller 108 may perform load balancing of network configuration controllers 110 to distribute the persistent connections to devices 19 between network configuration controllers 110 and to redistribute the persistent connections to devices 19 between network configuration controllers 110 as devices are added to and removed from network 112. For example, each of devices 19 is associated with a unique identifier, such as a device identifier, and controller 108 may use a hashing technique to perform hashing of the device identifier associated with each of devices 19 to distribute the persistent connections to devices 19 amongst network configuration controllers 110 based on the hashing of the device identifiers of devices 19, thereby assigning a non-overlapping portion of devices 19 to each of network configuration controllers 110.

Controller 108 may perform horizontal scaling of network configuration controllers 110 to add additional network configuration controllers to network configuration controllers 110 and/or to remove network configuration controllers to network configuration controllers 110 as the number of sessions managed by network configuration controllers 110 changes. For example, as the number of devices in devices 19 increases, controller 108 may horizontally scale network configuration controllers 110 by adding additional network configuration controllers to network configuration controllers 110 to maintain persistent connections with additional devices of devices 19.

Controller 108 may determine whether to add one or more additional network configuration controllers to network configuration controllers 110 based at least in part on the number of devices 19 managed by each of network configuration controllers 110. For example, controller 108 may periodically (e.g., every hour, every 30 minutes, etc.) determine the number of devices 19 managed by each of network configuration controllers 110. Controller 108 may also determine the maximum number of devices 19 that each of network configuration controllers 110 is able to manage. Controller 108 may determine, based at least in part on comparing the number of devices 19 managed by at least one of network configuration controllers 110 with the maximum number of devices 19 that each of network configuration controllers 110 is able to manage to determine whether to add one or more additional network configuration controllers to network configuration controllers 110. For example, if controller 108 determines that the number of devices 19 managed by at least one of network configuration controllers 110 is greater than the maximum number of devices 19 that each of network configuration controllers 110 is able to manage, controller 110 may automatically, horizontally scale to add an additional network configuration controller to network configuration controllers 108.

When an additional network configuration controller is added to network configuration controllers 110, controller 108 may re-assign devices 19 among network configuration controllers 110 in ways that reduce, and may minimize, the number of devices 19 that are reassigned to a different network configuration controller of network configuration controllers 110. To that end, controller 108 may use consistent hashing to distribute devices 19 among network configuration controllers 110. Consistent hashing is a hashing technique in which when a hash table is resized, only n/m keys may need to be remapped on average, where n is the number of keys and m is the number of slots. In contrast, in other hashing techniques, a change in the number of slots in a hash table may cause nearly all keys to be remapped.

Controller 108 may use a consistent hashing technique to perform hashing of the device identifier associated with each of devices 19 to distribute the persistent connections to devices 19 amongst network configuration controllers 110 based on the hashing of the device identifiers of devices 19. For example, controller 108 may perform consistent hashing of the device identifier associated with each of devices 19 to generate a resulting hash value associated with each of devices 19, and may map each of devices 19 to a network configuration controller of network configuration controllers 110 based on the resulting hash value of the device.

Specifically, each of network configuration controllers 110 may separately perform consistent hashing of the device identifiers associated with each of devices 19 to determine, by each network configuration controller, the subset of devices 19 to which the network configuration controller is to establish persistent connections. For example, each of network configuration controllers 110 may separately perform consistent hashing of the device identifiers associated with each of devices 19 to determine, by each network configuration controller, the subset of devices 19 to which the network configuration controller is to establish persistent connections upon a device being added to devices 19, a device being removed from devices 19, and the like.

When an additional network configuration controller is added to network configuration controllers 110 or when a network configuration controller is removed from network configuration controllers 110, controller 108 may re-assign one or more of devices 19 to different network configuration controllers of network configuration controllers 110 based on the hash values associated with the one or more of devices 19. Given m network configuration controllers 110 to connect to n devices 19, network controller 108 may use consistent hashing to re-distribute persistent connections to devices 19 over network configuration controllers 110 so that, on average, only n/m devices in devices 19 may need to be redistributed to another network configuration controller of network configuration controllers 110 when an additional network configuration controller is added to network configuration controllers 110. Specifically, each of network configuration controllers 110 may separately perform consistent hashing of the device identifiers associated with each of devices 19 to re-distribute the persistent connections to computing devices 19.

Figure 2:
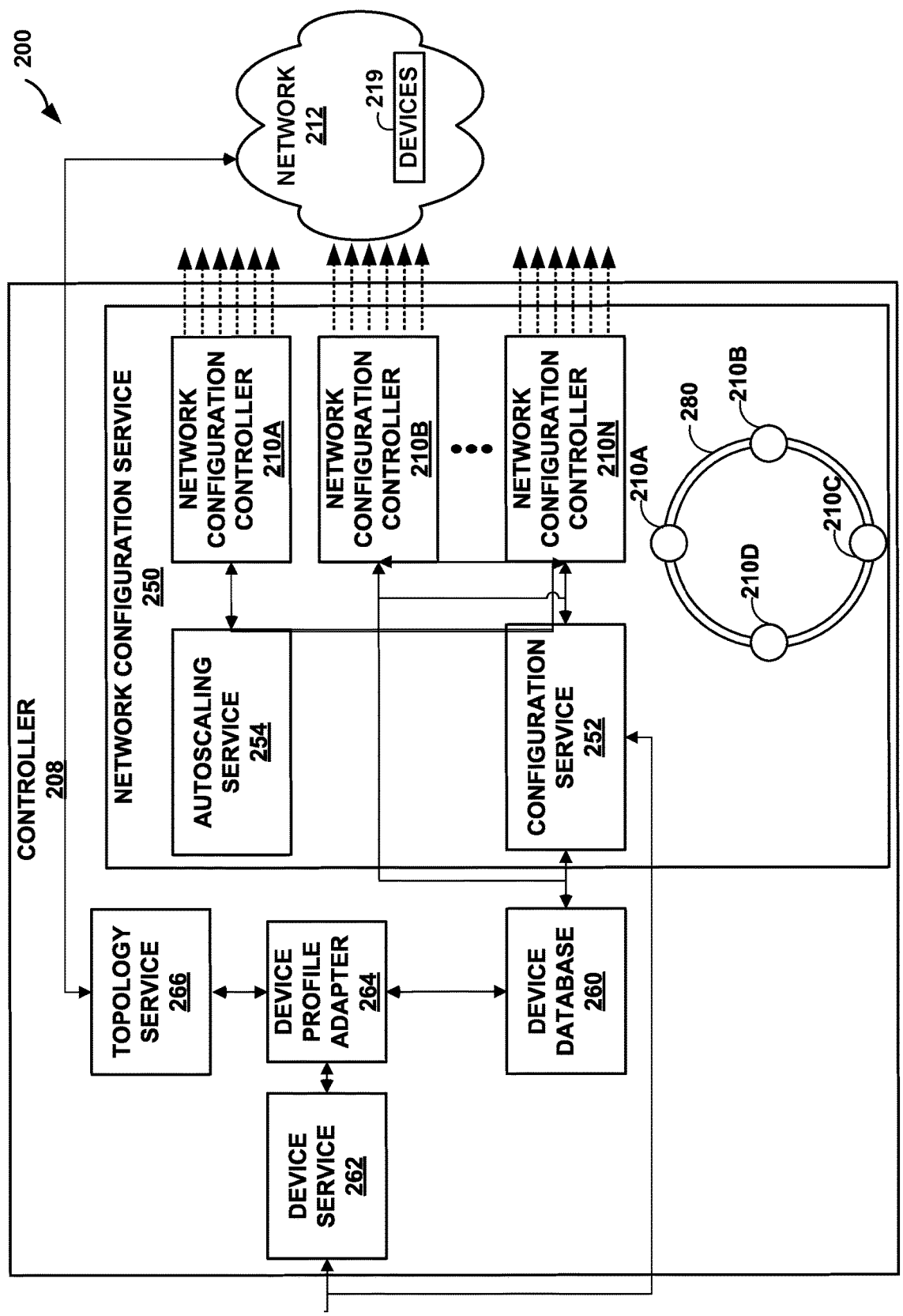
FIG. 2 is a block diagram illustrating an example controller that performs horizontal scaling of network configuration controllers, according to the techniques of this disclosure.

FIG. 2 is a block diagram illustrating an example controller that performs horizontal scaling of network configuration controllers, according to the techniques of this disclosure. The example controller 208 of FIG. 2 may represent an example implementation of controller 108 of FIG. 1. In some examples, controller 208 may be or may implement a WAN controller, a software-defined networking (SDN) controller, and the like.

As shown in FIG. 2, an example system 200 may include network 212 and controller 208. Network 212 may be similar to network 112 of FIG. 1 and may include devices 219 similar to devices 19 of FIG. 1. Controller 208 may establish persistent communications sessions with devices 219 in network 212.

Controller 208 may include device service 262, device database 260, device profile adapter 262, topology service 266, and network configuration service 250. Network configuration service 250 may be software executed by controller 208 to establish persistent communications sessions with devices 219 in network 212 and to manage the communication sessions with devices 219. Network configuration service 250 includes network configuration controllers 210A-210N (hereafter "network configuration controllers 210"), service 252, and autoscaling service 254.

Each of network configuration controllers 210 may maintain a persistent communication session with one or more of devices 219, and each of network configuration controllers 210 may be assigned to a non-overlapping portion of devices 219. Each of network configuration controllers 210 may be able to download configurations to and fetch device information from each of the one or more devices assigned to the network configuration controller, such as by invoking one or more remote procedure calls.

Network configuration service 250 may assign devices 219 to network configuration controllers 210 using a consistent hashing technique. Network configuration service 250 may perform a hash of a device identifier associated with each of devices 219 to generate a hash value for each of devices 219 and may determine, based at least in part on the hash value associated with a device of devices 219, the network configuration controller assigned to the device out of network configuration controllers 210. In some examples, network configuration service 250 may use a consistent hash ring, such as consistent hash ring 280, to perform the consistent hashing technique.

In some examples, each of network configuration controllers 210 may determine, based on the consistent hashing technique, such as by using consistent hash ring 280, the one or more devices of device 219 to which it is assigned. For example, device database 260 of controller 208 may store the device identifier of each of devices 219 as determined by network configuration service 250. Each of network configuration controllers 210 may retrieve the device identifier of each of devices 219 and may perform the consistent hashing technique to determine the one or more devices of devices 219 to which it is assigned.

In the example of FIG. 2, each of network configuration controllers 210 may use consistent hash ring 280 to perform the consistent hashing technique to determine, for each network configuration controllers 210, the one or more devices of devices 219 to which it is assigned. For example, each network configuration controller of network configuration controllers 210 may determine, based on a unique identifier associated with the network configuration controller, a location of the network configuration controller on consistent hash ring 280. Consistent hash ring 280 illustrates an example of network configuration controllers 210 comprising four network configuration controllers 210A-210D, where each of network configuration controllers 210A-210D are located in consistent hash ring 280 equidistant from each other.

Network configuration controllers 210 may determine, for each of devices 219 based on performing consistent hashing of the device identifiers of each of devices 219, the location of each of devices 219 on consistent hash ring 280. Network configuration controllers 210 may therefore determine, based on the location of each of devices 219 on consistent hash ring 280, the network configuration controllers 210 out of network configuration controllers 210A-210D to which the device is assigned.

In some examples, network configuration controllers 210 may assign devices 219 to the closest network configuration controller that is to the left (i.e., counter-clockwise direction) of devices 219. Thus, devices 219 that are located in consistent hash ring 280 between network configuration controllers 210A and 210B are assigned to network configuration controller 210A. In another example, network configuration controllers 210 may assign devices 219 to the closest network configuration controller that is to the right (i.e., clockwise direction) of devices 219. Thus, devices 219 that are located in consistent hash ring 280 between network configuration controllers 210A and 210B are assigned to network configuration controller 210B. In this way, network configuration controllers 210 may determine, based on the consistent hashing technique, the one or more devices of devices 219 to which it is assigned.

Each of network configuration controllers 210 may determine, based on performing consistent hashing of the device identifiers of each of devices 219, whether to add one or more persistent communication sessions with one or more of devices 219 or to remove one or more persistent communication sessions with one or more of devices 219. Specifically, a network configuration controller of network configuration controllers 210 may identify, based on performing consistent hashing of the device identifiers of each of devices 219, one or more of devices 219 to which the network configuration controller is to establish one or more persistent communication sessions. If the network configuration controller determines that the identified one or more of devices 219 includes one or more devices to which the network configuration controller has not yet established persistent communication sessions, network configuration controller 210 may add one or more persistent communication sessions with the identified. one or more of devices 219. Conversely, if the network configuration controller determines that the identified one or more of devices 219 does not include one or more devices to which the network configuration controller has established persistent communication sessions, network configuration controller 210 may remove the one or more persistent communication sessions with the identified. one or more of devices 219.

In some examples, network configuration controllers 210 may perform consist hashing of the device identifiers of devices 219 to determine the devices 219 assigned to each of network configuration controllers 210 in response to receiving a request to provision a persistent communication session with a device in network 212 or to remove a persistent communication session with a device in network 212. In some examples, network configuration controllers 210 may perform consist hashing of the device identifiers of devices 219 to determine the devices 219 assigned to each of network configuration controllers 210 in response to receiving a request to re-map one or more of the persistent communication sessions with devices 219. In some examples, network configuration controllers 210 may perform consist hashing of the device identifiers of devices 219 to determine the devices 219 assigned to each of network configuration controllers 210 in response to receiving any indications that one or more devices have been added to devices 219 or have been removed from devices 219 in network 212.

If a network configuration controller of network configuration controllers 210 determines to remove a persistent communication session with a device of devices 219 in response to performing the consistent hashing technique, the network configuration controller may not remove the persistent communication session immediately upon determining the remove the persistent communication session. Instead, the network configuration controller may wait until after a task that is currently actively using the persistent communication session is completed and may remove the persistent communication session after the task has completed.

For example, if a persistent communication session to a device of devices 219 is being remapped, based on the consistent hashing, from network configuration controller 210A to network configuration controller 210B, network configuration controller 210A may determine whether a task is currently actively using the persistent communication session to the device (e.g., to perform configuration of the device). While the task is currently actively using the persistent communication session to the device, network configuration controller 210B may establish a persistent communication session to the device. When the task using the persistent communication session established by configuration controller 210A is complete, network configuration controller 210A may then remove the persistent communication session to the device, thereby enabling remapping of persistent communication sessions between network configuration controllers 210A and 210B without interrupting active tasks using a persistent communication session that is to be remapped.

Configuration service 252 may be or host one or more services for handling requests to provision devices of devices 219 and/or requests for status or other information regarding devices 219 from clients. Configuration service 252 may, in response to receiving a request for information regarding a specific device of devices 219, determine the network configuration controller of network configuration controllers 210 that is assigned to and managing the specific device, and may route the request for information to the determined network configuration controller of network configuration controllers 210 that is assigned to and managing the specific device. In some examples, configuration service 252 maybe or host a gRPC remote procedure call (gRPC) service or an advanced messaging queuing protocol (AMQP) service.

Autoscaling service 254 may perform automatic horizontal scaling of network configuration controllers 210. Specifically, autoscaling service 254 may, based on the amount of devices 219 managed by each of network configuration controllers 210, add or instantiate an additional network controller to network configuration controllers 210 to manage devices 219. Autoscaling service 254 may periodically determine the number of devices serviced by each of network configuration controllers 210 and may determine, based at least in part on the number of devices serviced by each of network configuration controllers 210, whether to horizontally scale network configuration controllers 210, such as by adding an additional network controller to network configuration controllers 210 to manage devices 219. In some examples, autoscaling service 254 may be a Kubernetes timed task that is set to determine every hour, every 30 minutes, and the like, determine the number of devices serviced by each of network configuration controllers 210.

Network configuration controllers 210 may provide an application programming interface (API) that is exposed to provide the number of devices managed by each network configuration controller of network configuration controllers 210 and the maximum number of devices that can be managed by each of network configuration controllers 210. In some examples, the maximum number of devices that can be managed by each of network configuration controllers 210 may be a user configurable value.

Autoscaling service 254 may use the API provided by network configuration service 250 to periodically determine the number of devices serviced by each of network configuration controllers 210, and may compare the determined number of devices serviced by each of network configuration controllers 210 with the maximum number of devices that can be managed by each of network configuration controllers 210 to determine whether to add an additional network controller to network configuration controllers 210. In some examples, autoscaling service 254 may, in response to determining that the number of devices serviced by at least one of network configuration controllers 210 is greater than the maximum number of devices that can be managed by each of network configuration controllers 210, add an additional network controller to network configuration controllers 210 to manage devices 219, such as by instantiating an additional network configuration controller.

Network configuration controllers 210 may, in response to an additional network controller being added to network configuration controllers 210 and/or in response to controller 208 receiving a request to provision an additional persistent communication session with devices 219, remap one or more of devices 219. That is, each network configuration controller of network configuration controllers 210 may re-determine the one or more devices of devices 219 to which it is assigned to establish persistent communication sessions. As described above, each of network configuration controllers 210 may determine, based on performing the consistent hashing technique, the one or more devices of device 219 to which it is assigned to establish persistent communication sessions. For example, device database 260 of controller 208 may store the device identifier of each of devices 129 as determined by network configuration service 250. Each of network configuration controllers 210 may retrieve the device identifier of each of devices 219 and may perform the consistent hashing technique to determine the one or more devices of device 219 to which it is assigned. In this way, network configuration service 250 may perform automatic horizontal scaling of network configuration controllers 210.

In some examples, the techniques of this disclosure may also be useful for re-assigning devices 219 amongst network configuration controllers 210 when one or more of network configuration controllers 210 stops working. Each of network configuration controllers 210 may periodically (e.g., once every few seconds) register with network database 260. If network configuration service 250 determines that a network configuration controller of network configuration controllers 210 has failed to register with network database 260, then network configuration service 250 may determine that the network configuration controller has stopped working.

Network configuration controllers 210 may, in response to determining that a network controller of network configuration controllers 210 has stopped working, remap one or more of devices 219. That is, each network configuration controller of network configuration controllers 210 may re-determine the one or more devices of devices 219 to which it is assigned. As described above, each of network configuration controllers 210 may determine, based on the consistent hashing technique, the one or more devices of device 19 to which it is assigned. For example, device database 260 of controller 208 may store the device identifier of each of devices 19 as determined by network configuration service 250. Each of network configuration controllers 210 may retrieve the device identifier of each of devices 19 and may perform the consistent hashing technique to determine the one or more devices of device 19 to which it is assigned.

In some examples, controller 208 may also include network database 260, device profile adapter 264, topology service 266, and device service 262. Network database 260 that may store information associated with each of devices 219 in network 212 that are managed by network configuration controllers 210. For example, network database 260 may store the device identifier associated with each of devices 219. In some examples, network database 260 may also store a unique identifier associated with each of network configuration controllers 210. Examples of network database 260 may include a Remote Dictionary Server (REDIS) database.

Topology service 266 may communicate with network 212 to determine information regarding network 212 and devices 219. In some examples, topology service 266 may receive Border Gateway Protocol Link-State (BGP-LS) data that contains information regarding network 212 and devices 219. Device service 262 may provide an API, such as a representational state transfer (REST) API, for configuring controller 208 and for receiving requests for information regarding controller 208, such as information regarding network configuration controllers 210. Device profile adapter 264 may communicate with topology service 266 and device service 262 to enable topology service 266 and device service 262 to interact with network configuration service 250.

For example, if topology service 266 receives a request to provision a connection between a new device of devices 219 and network configuration controllers 212, topology service 266 may forward the request to device profile adapter 264, and device profile adapter 264 may communicate with device database 260 and/or network configuration service 250 to provision a connection between a new device of devices 219 and network configuration controllers 212. Similarly, if device service 262 receives a request for information regarding network configuration controllers 210, device service 262 may forward the request to device profile adapter 264, and device profile adapter 264 may communicate with device database 260 and/or network configuration service 250 to service the request for information.

Figure 3:
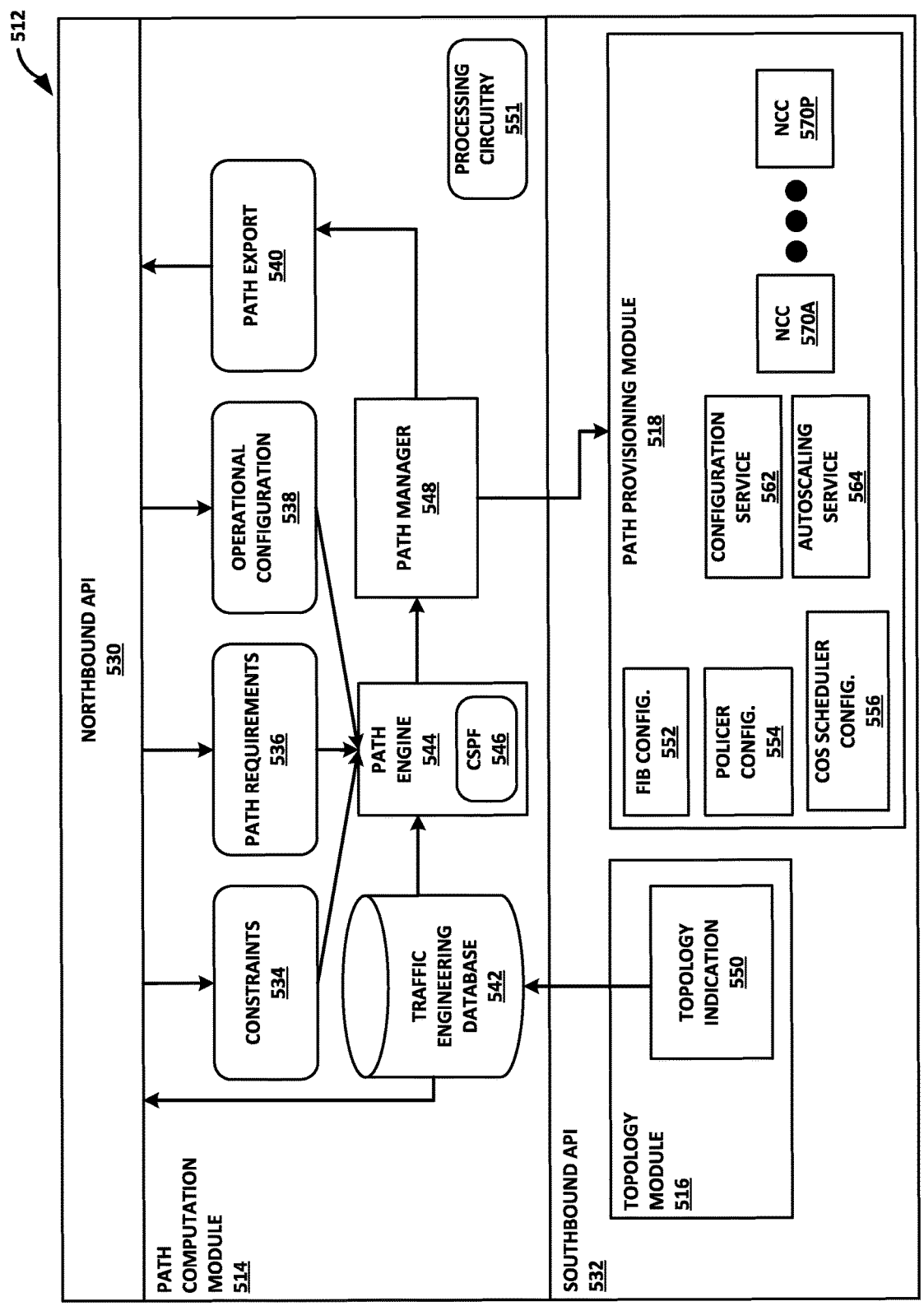
FIG. 3 is a block diagram illustrating an example controller, according to techniques of this disclosure.

FIG. 3 is a block diagram illustrating an example controller, according to techniques of this disclosure. Controller 512 may represent an example implementation of controller 108 of FIG. 1 and controller 208 of FIG. 2. Controller 512 may be or implement a WAN controller, software-defined networking (SDN) controller, and/or path computation element, for instance.

In general, path computation module 514 and path provisional module 518 of controller 512 may use protocols to instantiate paths between the Path Computation Clients (e.g., routers) in a network. Southbound API 532 allows controller 512 to communicate with SR-enabled and other network nodes, e.g., devices 19 of FIG. 1, devices 219 of FIG. 2, and/or routers and switches of the network using, for example, ISIS, OSPFv2, BGP-LS, and PCEP protocols. By providing a view of the global network state and bandwidth demand in the network, controller 512 is able to compute optimal paths and provision the network for forwarding using lists of SIDs in an SR paradigm.

In some examples, application services issue path requests to controller 512 to request paths in a path computation domain controlled by controller 512. For example, a path request includes a required bandwidth or other constraint and two endpoints representing an access node and an edge node that communicate over the path computation domain managed by controller 512. Path requests may further specify time/date during which paths must be operational and Class of Service (CoS) parameters (for instance, bandwidth required per class for certain paths).

Controller 512 accepts path requests from application services to establish paths between the endpoints over the path computation domain. Paths may be requested for different times and dates and with disparate bandwidth requirements. Controller 512 reconciling path requests from application services to multiplex requested paths onto the path computation domain based on requested path parameters and anticipated network resource availability.

To intelligently compute and establish paths through the path computation domain, controller 512 includes topology module 516 to maintain topology information (e.g., a traffic engineering database) describing available resources of the path computation domain, including access, aggregation, and edge nodes, interfaces thereof, and interconnecting communication links. In some examples, topology module 516 is an example of topology service 266 of controller 208 of FIG. 2.

Path computation module 514 of controller 512 computes requested paths through the path computation domain. In general, paths are unidirectional. Upon computing paths, path computation module 514 schedules the paths for provisioning by path provisioning module 518. A computed path includes path information usable by path provisioning module 518 to establish the path in the network. Provisioning a path may require path validation prior to committing the path to provide for packet transport.

Further example details of a distributed WAN controller may be found in U.S. Pat. No. 9,450,817, entitled "Software Defined Network Controller," the entire contents of which is incorporated herein by reference. This is merely one example, and controller 512 may compute and provision paths in other ways.

In this example, controller 512 includes northbound and southbound interfaces in the form of northbound application programming interface (API) 530 and southbound API (532). Northbound API 530 includes methods and/or accessible data structures by which, as noted above, application services may configure and request path computation and query established paths within the path computation domain. Southbound API 532 includes methods and/or accessible data structures by which controller 512 receives topology information for the path computation domain and establishes paths by accessing and programming data planes of aggregation nodes and/or access nodes within the path computation domain.

Path computation module 514 includes data structures to store path information for computing and establishing requested paths. These data structures include constraints 534, path requirements 536, operational configuration 538, and path export 540. Application services may invoke northbound API 530 to install/query data from these data structures. Constraints 534 represent a data structure that describes external constraints upon path computation. Constraints 534 allow Application services to, e.g., modify link attributes such as metrics before path computation module 514 computes a set of paths.

Application services may modify attributes of a link to effect resulting traffic engineering computations. In such instances, link attributes may override attributes received from topology indication module 550 and remain in effect for the duration of the node/attendant port in the topology. A link edit message to constraints 534 may include a link descriptor specifying a node identifier and port index, together with link attributes specifying a bandwidth, expected time to transmit, shared link group, and fate shared group, for instance. The link edit message may be sent by the controller 512.

Operational configuration 538 represents a data structure that provides configuration information to controller 512 to configure the path computation algorithm with respect to, for example, class of service (CoS) descriptors and detour behaviors. Operational configuration 538 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 540 represents an interface that stores path descriptors for all paths currently committed or established in the path computation domain. In response to queries received via northbound API 530, path export 540 returns one or more path descriptors. Queries received may request paths between any two edge and access nodes terminating the path(s). In some examples, path descriptors may be used by Application services to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 536 represent an interface that receives path requests for paths to be computed by path computation module 536 and provides these path requests (including path requirements) to path engine 544 for computation. Path requirements 536 may be received, or may be handled by the controller. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 516 includes topology indication module 550 to handle topology discovery and, where needed, to maintain control channels between controller 512 and nodes of the path computation domain. Topology indication module 550 may include an interface to describe received topologies to path computation module 514.

Topology indication module 550 may use a topology discovery protocol to describe the path computation domain topology to path computation module 514. In one example, using a cloud control protocol mechanism for topology discovery, topology indication module 550 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 550 may communicate with a topology server, such as a routing protocol route reflector, to receive topology information for a network layer of the network. Topology indication module 550 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 550 may in some instances be a passive listener that neither forwards nor originates routing protocol advertisements. In some instances, topology indication module 550 may alternatively, or additionally, execute a topology discovery mechanism such as an interface for an Application-Layer Traffic Optimization (ALTO) service. Topology indication module 550 may therefore receive a digest of topology information collected by a topology server, e.g., an ALTO server, rather than executing a routing protocol to receive routing protocol advertisements directly.

In some examples, topology indication module 550 receives topology information that includes traffic engineering (TE) information. Topology indication module 550 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 550 executes BGP-TE to receive advertised TE information for inter-autonomous system and other out-of-network links.

Traffic engineering database (TED) 542 stores topology information, received by topology indication module 550, for a network that constitutes a path computation domain for controller 512 to a computer-readable storage medium (not shown). TED 542 may include one or more link-state databases (LSDBs), where link and node data is received in routing protocol advertisements, received from a topology server, and/or discovered by link-layer entities such as an overlay controller and then provided to topology indication module 550. In some instances, an operator may configure traffic engineering or other topology information within MT TED 542 via a client interface.

Path engine 544 accepts the current topology snapshot of the path computation domain in the form of TED 542 and computes, using TED 542, CoS-aware traffic-engineered paths between nodes as indicated by configured node-specific policy (constraints 534) and/or through dynamic networking with external modules via APIs. Path engine 544 may further compute detours for all primary paths on a per-CoS basis according to configured failover and capacity requirements (as specified in operational configuration 538 and path requirements 536, respectively).

In general, to compute a requested path, path engine 544 determines based on TED 542 and all specified constraints whether there exists a path in the layer that satisfies the TE specifications for the requested path for the duration of the requested time. Path engine 544 may use the Dijkstra constrained SPF (CSPF) 546 path computation algorithms for identifying satisfactory paths though the path computation domain. If there are no TE constraints, path engine 544 may revert to SPF. If a satisfactory computed path for the requested path exists, path engine 544 provides a path descriptor for the computed path to path manager 548 to establish the path using path provisioning module 518. A path computed by path engine 544 may be referred to as a "computed" path, until such time as path provisioning 518 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 548 establishes computed scheduled paths using path provisioning module 518, which in this instance includes forwarding information base (FIB) configuration module 552 (illustrated as "FIB CONFIG. 552"), policer configuration module 554 (illustrated as "POLICER CONFIG. 554"), and CoS scheduler configuration module 556 (illustrated as "COS SCHEDULER CONFIG. 556").

FIB configuration module 552 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 552 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 552 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure).

FIB configuration module 552 may add, change (i.e., implicit add), or delete forwarding table entries in accordance with information received from path computation module 514. A FIB configuration message from path computation module 514 to FIB configuration module 552 may specify an event type (add or delete); a node identifier; a path identifier; one or more forwarding table entries each including an ingress port index, ingress label, egress port index, and egress label; and a detour path specifying a path identifier and CoS mode.

Policer configuration module 554 may be invoked by path computation module 514 to request a policer be installed on a particular aggregation node or access node for a particular LSP ingress. As noted above, the FIBs for aggregation nodes or access nodes include policers at LSP ingress. Policer configuration module 554 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 552 configures the policers in accordance with the policer configuration requests.

CoS scheduler configuration module 556 may be invoked by path computation module 514 to request configuration of CoS scheduler on the aggregation nodes or access nodes. CoS scheduler configuration module 556 may receive the CoS scheduler configuration information. A scheduling configuration request message may specify an event type (change); a node identifier; a port identity value (port index); and configuration information specifying bandwidth, queue depth, and scheduling discipline, for instance.

Path engine 544 may compute lists of segment identifiers (SIDs) that satisfy each path in a multipath solution for a segment routing (SR) policy. Path provisioning module 518 may output the lists of SIDs to the SR-enabled network nodes to provision the network to forward traffic along the multipath.

Controller 512 includes a hardware environment including processing circuitry 551 for executing machine-readable software instructions for implementing modules, interfaces, managers, and other components illustrated and described with respect to controller 512. The components may be implemented solely in software, or hardware, or may be implemented as a combination of software, hardware, or firmware. For example, controller 512 may include one or more processors comprising processing circuitry 551 that execute program code in the form of software instructions. In that case, the various software components/modules of may comprise executable instructions stored on a computer-readable storage medium, such as computer memory or hard disk (not shown).

Network configuration controllers 570A-570P ("network configuration controllers 570) are examples of network configuration controllers 110 of FIG. 1 and network configuration controllers 210 of FIG. 2, and may be software instances that execute at processing circuitry 551 to provision and configure LSPs by maintaining sessions with network devices in a network. For example, network configuration controllers 570 may be NETCONF configuration controllers configured to maintain and manage active and persisted NETCONF sessions with network devices in order to provision NETCONF-based LSPs.

Each of network configuration controllers 570 may maintain a pool of persistent connections, such as NETCONF connections, to a set of network devices, and network configuration controllers 570 may distribute to each of network configuration controllers 570, the connections to network devices using a consistent hashing algorithm. Network configuration controllers 570 may invoke remote procedure calls (RPCs) on the connected network devices to download configuration, fetch device information, and the like.

Network configuration controllers 570 may use consistent hashing distribute and redistribute connections to network devices by generating, for each connection to a network device, a hash value by hashing a unique identifier of the network device, such as by hashing a device identifier for the network device. Network configuration controllers 570 may therefore assign each connection to a network device to one of network configuration controller 570 based at least in part on the hash value for the connection. In some examples, network configuration controllers 570 may use a consistent hash ring to assign each connection to a network device to one of network configuration controller 570 using consistent hashing. For example, network configuration controllers 570 may map themselves onto locations in a consistent hash ring based at least in part on unique identifiers associated with the network configuration controllers 570. Network configuration controller 570 may also map each connection to a network device onto the hash ring based on the hash value associated with the network device, and may determine, for each connection to a network device, the network configuration controller that is assigned to the connection out of network configuration controllers 570 based on the location of the connection to the network device on the hash ring.

When the number of connections managed by network configuration controllers 570 changes, such as when new network devices register with controller 512, or when network devices drop off of the network, network configuration controllers 570 may redistribute the connections managed by network configuration controllers 570 using the consistent hashing algorithm. As described above, consistent hashing is a hashing technique in which when a hash table is resized, only n/m keys may need to be remapped on average, where n is the number of keys and m is the number of slots. In contrast, in other hashing techniques, a change in the number of slots in a hash table may cause nearly all keys to be remapped. Thus, when network configuration controllers 570 redistributes n connections among m network configuration controllers 570, only n/m connections, on average, may have to be remapped to different network configuration controllers out of network configuration controllers 570.

Configuration service 562 may be an example of configuration service 252 of FIG. 2. Configuration service 562 may be or host one or more services for handling requests to provision devices and/or requests for status or other information regarding the devices connected to network configuration controller 570. Configuration service 562 may, in response to receiving a request for information regarding a specific device connected to network configuration controllers 570, determine the network configuration controller of network configuration controllers 570 that is assigned to and managing the specific device, and may route the request for information to the determined network configuration controller of network configuration controllers 570 that is assigned to and managing the specific device. In some examples, configuration service 562 maybe or host a gRPC service or an AMPQ service.

Network configuration controllers 570 may periodically register themselves with configuration service 562, such as every few seconds (e.g., every 3 seconds, every 5 seconds, etc.) If network configuration service 562 determines that a network configuration controller of network configuration controllers 570 has failed to register with network configuration service 562, network configuration controller 570 may determine that the network configuration controller that failed to register with network configuration service 562 has gone down (i.e., stopped working or otherwise malfunctioned). Network configuration controller 570 may, in response to determining that a network configuration controller has gone down, cause network configuration controllers 570 to use consistent hashing to redistribute the connections to network devices among the network configuration controllers 570 that are still up and running.

Path provisioning module 518 may expose a custom API that provides the number of connections with network devices managed by each network configuration controller of network configuration controllers 570 and the maximum number of connections to network devices that can be managed by each of network configuration controllers 570. Configuration service 562 may execute at processing circuitry 551 to provide the ability for the maximum number of connections to devices that can be managed by each of network configuration controllers 570 to be customized, such as by an administrator of controller 512.

Autoscaling service 564 may be an example of autoscaling service 254 of FIG. 2. Autoscaling service 564 may execute at processing circuitry 551 to use the exposed API to periodically determine the number of connections to network devices maintained by each of network configuration controllers 570, and may compare the determined number of connections maintained by each of network configuration controllers 570 with the maximum number of sessions that can be managed by each of network configuration controllers 210 to determine whether to add an additional network controller to network configuration controllers 570.

For example, autoscaling service 564 may be a timed Kubernetes task with a configurable time window, such as one hour, that calls, once per hour, the exposed API to periodically determine the number of connections to network devices maintained by each of network configuration controllers 570 and the number of connections to network devices maintained by each of network configuration controllers 570 compare with the maximum number of sessions that can be managed by each of network configuration controllers 210 to determine whether to add an additional network controller to network configuration controllers 570. In some examples, autoscaling service 564 may, in response to determining that the number of connections to devices serviced by at least one of network configuration controllers 570 is greater than the maximum number of connections to devices that can be managed by each of network configuration controllers 570, add an additional network controller to network configuration controllers 570 to manage the connections to the devices, such as by instantiating an additional network configuration controller.

Figure 4:
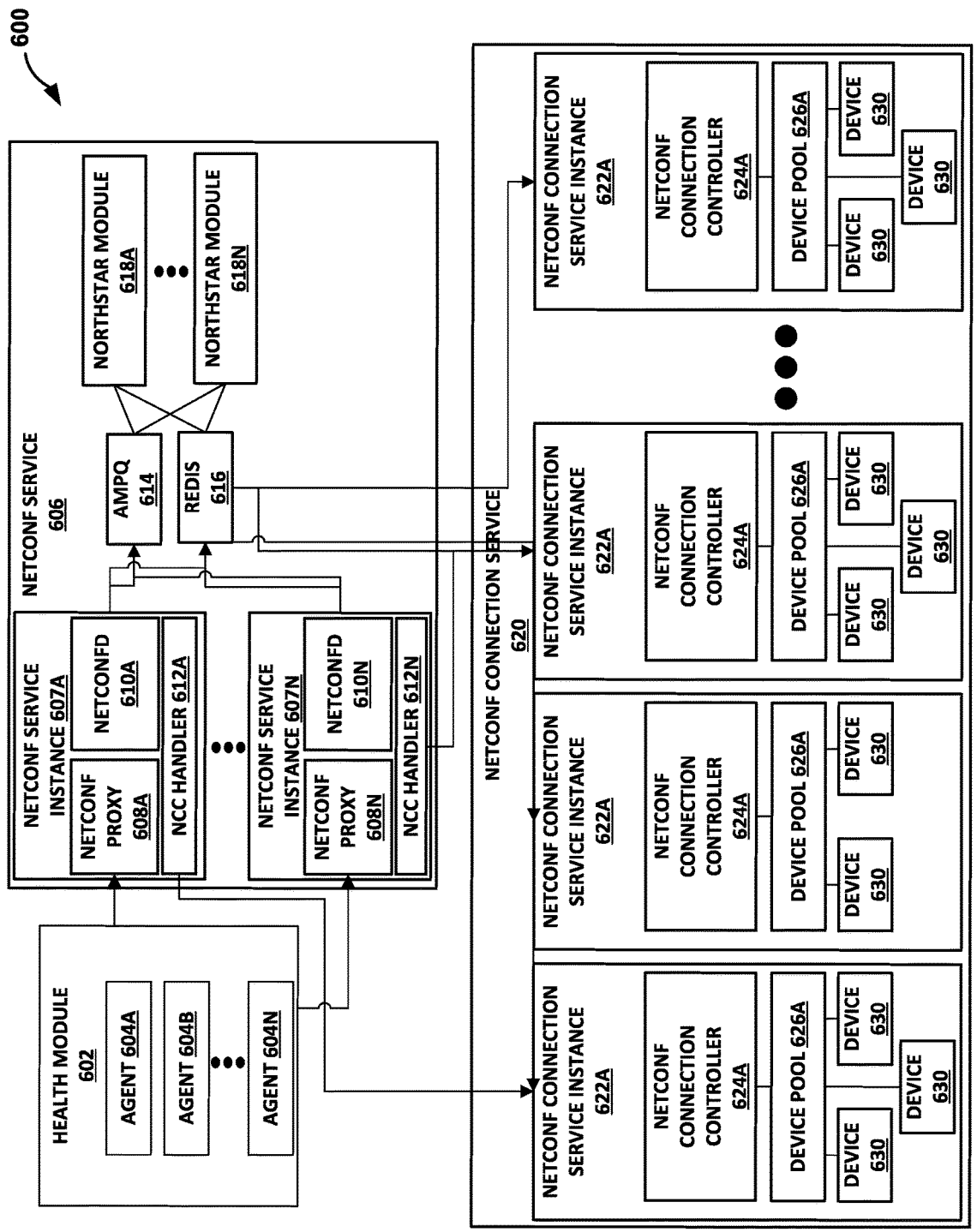
FIG. 4 is a block diagram illustrating an example controller, according to techniques of this disclosure.

FIG. 4 is a block diagram illustrating an example controller, according to techniques of this disclosure. Controller 600 may represent an example implementation of controller 108 of FIG. 1, controller 208 of FIG. 2, and controller 512 of FIG. 3 that maintain active and persistent sessions with network devices using NETCONF. Controller 600 may be or implement a WAN controller, software-defined networking (SDN) controller, and/or path computation element, for instance, such as a Northstar controller.

As shown in FIG. 4, controller 600 may include health module 602 configured to monitor the health of a network, such as network 112 of FIG. 1 or network 212 of FIG. 2. Specifically, health module 602 may diagnose and root cause network issues, detect network anomalies, predict potential network issues, and create real-time remedies for any issues that come up. Health module 602 includes agents 604A-604N ("agents 604") to perform such monitoring of the health of the network. Agents 604 may send the collected information of the health of the network to NETCONF service instances 607A-607N ("NETCONF service instances 607") of NETCONF service 606, such as in the form of gRPC invocations.

Controller 600 may also include NETCONF service 606 configured to host gRPC/AMQP-message based services for handling the provisioning requests and/or status information requests from clients and for configuring NETCONF connection service 620. Specifically, NETCONF service 606 may route such requests to the corresponding NETCONF connection service instance of NETCONF connection service 620.

NETCONF service 606 includes NETCONF service instances 607. NETCONF service instances 607 are examples of autoscaling service 254 and configuration service 252 of FIG. 2. Each of NETCONF service instances 607 may provide various NETFONF services to a corresponding NETCONF connection instance of NETCONF connection service 620. For example, NETCONF service instances 607 may include NETCONF proxies 608A-608N ("NETCONF proxies 608"), NETCONF daemons 610A-610N ("NETCONF daemons 610"), and NETCONF connection handlers 612A-612N ("NETCONF connection handlers 612").

NETCONF service instances 607 may communicate with AMQP service 614 and REDIS database 616. NETCONF service instances 607 may store in REDIS database 616 information associated with each of the devices managed by controller 600 in the network. AMQP service 646 may support a wide variety of messaging applications and communication patterns and provides flow controlled, message-oriented communication with message-delivery guarantees. Other modules, such as Northstar modules 618A-618N, of controller 600 may also make use of REDIS database 616 and AMQP service 614.

NETCONF connection service 620 is configured to maintain and manage a pool of persistent NETCONF connections to devices 630. NETCONF connection service 620 includes NETCONF connection service instances 622A-622N ("NETCONF connection service instances 622"), which are examples of network configuration controllers 110 of FIG. 1 and network configuration controllers 210 of FIG. 2. NETCONF connection service instances 622 may maintain persistent NETCONF connection sessions with devices 630. NETCONF connection service instances 622 may maintain device pools 626A-626N ("device pools 626") that manage, for each of NETCONF connection service instances 622, pools of such persistent NETCONF connection sessions with devices 630. The persistent NETCONF connections are allocated to NETCONF connection service instances 622 using a consistent hashing algorithm.

NETCONF connection service instances 622 may also include NETCONF connection controllers 624A-624N ("NETCONF connection controllers 624") for provisioning NETCONF connection sessions, such as in response to receiving provisioning requests from NETCONF service instances 607, and determining, using the consistent hashing algorithm, whether to re-map and/or re-assign devices 630 to which NETCONF connection service instances 622 establishes NETCONF connection sessions when a device of devices 630 is removed from the network or when a device is added to devices 630.

Figure 5:
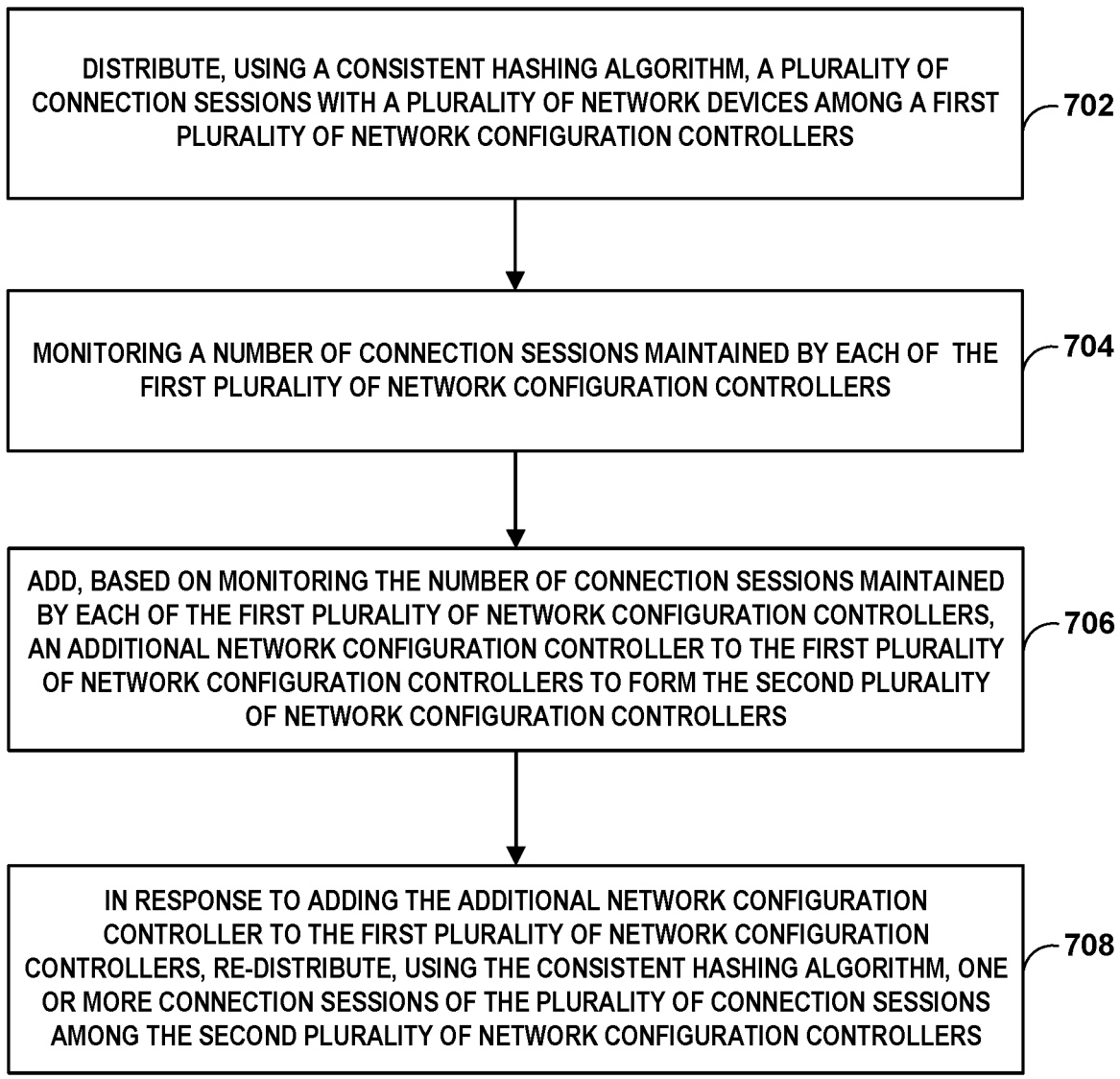
FIG. 5 is a flow diagram illustrating an example operation of a computing device, in accordance with one or more techniques of this disclosure.

FIG. 5 is a flow diagram illustrating an example operation of a computing device, in accordance with one or more techniques of this disclosure. The computing device may be a computing device of controller 108, controller 208, controller 512, or other controller described herein, or may represent a network node, such as a head-end or ingress router for an SR policy. The flow diagram is described with respect to controller 208, however.

As seen in the example of FIG. 4, a first plurality of network configuration controllers 210 of a controller 208 may distribute, using a consistent hashing algorithm, a plurality of connection sessions with a plurality of network devices 219 among the first plurality of network configuration controllers (702). Controller 208 may monitor a number of connection sessions maintained by each of the first plurality of network configuration controllers 210 (704). The controller 208 may add, based on monitoring the number of connection sessions maintained by each of the first plurality of network configuration controllers 210, an additional network configuration controller to the first plurality of network configuration controllers 210 to form a second plurality of network configuration controllers 210 (706). The second plurality of network configuration controllers 210 may, in response to adding the additional network configuration controller to the first plurality of network configuration controllers 210, re-distribute, using the consistent hashing algorithm, one or more connection sessions of the plurality of connection sessions among the second plurality of network configuration controllers 210 (708).

This disclosure includes the following examples.

Example 1: A method includes distributing, by a first plurality of network configuration controllers of a controller and using a consistent hashing algorithm, a plurality of connection sessions with a plurality of network devices among the first plurality of network configuration controllers; monitoring, by the controller, a number of connection sessions maintained by each of the first plurality of network configuration controllers; adding, by the controller and based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distributing, by the second plurality of network configuration controllers and using the consistent hashing algorithm, one or more connection sessions of the plurality of connection sessions among the second plurality of network configuration controllers.

Example 2: The method of example 1, wherein distributing, using the consistent hashing algorithm, the plurality of connection sessions with a plurality of network devices among the first plurality of network configuration controllers further comprises: determining, by each of the first plurality of network configuration controllers and using the consistent hashing algorithm, a corresponding non-overlapping portion of the plurality of connection sessions to maintain.

Example 3: The method of any of examples 1 and 2, wherein distributing, using the consistent hashing algorithm, the plurality of connection sessions with a plurality of network devices among the first plurality of network configuration controllers further comprises: hashing, by the first plurality of network configuration controllers of the controller, and using the consistent hashing algorithm, each of a plurality of device identifiers associated with the plurality of network devices to determine, for each of the plurality of network devices, a corresponding hash value; and distributing, by the first plurality of network configuration controllers of the controller, the plurality of connection sessions with a plurality of network devices among the first plurality of network configuration controllers based at least in part on the corresponding hash value of each of the plurality of network devices.

Example 4: The method of any of examples 1-3, wherein distributing, using the consistent hashing algorithm, the plurality of connection sessions with a plurality of network devices among the first plurality of network configuration controllers further comprises: distributing, by the first plurality of network configuration controllers of the controller using a consistent hash ring, the plurality of connection sessions with a plurality of network devices among the first plurality of network configuration controllers.

Example 5: The method of any of examples 1-4, wherein monitoring the number of connection sessions maintained by each of the plurality of connection sessions further comprises: periodically determining, by a timed task at the controller, the number of connection sessions maintained by each of the plurality of connection sessions.

Example 6: The method of any of examples 1-5, wherein adding, based on monitoring the number of connection sessions maintained by each of the first plurality of network configuration controllers, the additional network configuration controller to the first plurality of network configuration controllers further comprises: determining, by the controller, whether to add the additional network configuration controller to the first plurality of network configuration controllers to form the second plurality of network configuration controllers based at least in part on comparing the number of connection sessions maintained by each of the first plurality of network configuration controllers is greater than a maximum number of connections that can be maintained by each of the first plurality of network configuration controllers.

Example 7: The method of any of examples 1-6, wherein determining whether to add the additional network configuration controller to the first plurality of network configuration controllers based at least in part on comparing the number of connection sessions maintained by each the first plurality of network configuration controllers is greater than a maximum number of connections that can be maintained by each of the first plurality of network configuration controllers further comprises: determining, by the controller, whether the number of connection sessions maintained by at least one of the first plurality of network configuration controllers is greater than the maximum number of connections that can be maintained by each of the first plurality of network configuration controllers; and in response to determining that the number of connection sessions maintained by at least one of the first plurality of network configuration controllers is greater than the maximum number of connections that can be maintained by each of the first plurality of network configuration controllers, adding, by the controller, the additional network configuration controller to the first plurality of network configuration controllers to form the second plurality of network configuration controllers.

Example 8: The method of any of examples 1-7, wherein re-distributing, using the consistent hashing algorithm, the one or more connection sessions of the plurality of connection sessions among the second plurality of network configuration controllers further comprises: determining, by each of the second plurality of network configuration controllers at the controller using the consistent hashing algorithm, a corresponding second non-overlapping portion of the plurality of connection sessions to maintain to re-distribute the one or more connection sessions of the plurality of connection sessions among the second plurality of network configuration controllers.

Example 9: The method of any of examples 1-8, further includes determining, by the controller, that a network configuration controller of the second plurality of network configuration controllers have stopped working; and in response to determining that the network configuration controller of the second plurality of network configuration controllers have stopped working, re-distributing, by the second plurality of network configuration controllers using the consistent hashing algorithm, the one or more connection sessions of the plurality of connection sessions among the second plurality of network configuration controllers.

Example 10: The method of example 9, wherein determining, by the controller, that the network configuration controller of the second plurality of network configuration controllers have stopped working further comprises: periodically registering, by each of the second plurality of network configuration controllers, with the controller; and determining, by the controller, that the network configuration controller has failed to register with the controller.

Example 11: The method of any of examples 1-10, wherein: The first plurality of network configuration controllers and the second plurality of network configuration controllers comprise a plurality of Network Configuration Protocol (NETCONF) controllers; and the plurality of connection sessions comprise a plurality of NETCONF sessions.

Example 12: A computing device includes a memory; and processing circuitry in communication with the memory, the processing circuitry configured to: distribute, by a first plurality of network configuration controllers and using a consistent hashing algorithm, a plurality of connection sessions with a plurality of network devices among the first plurality of network configuration controllers; monitor a number of connection sessions maintained by each of the first plurality of network configuration controllers; add, based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

Example 13: The computing device of example 12, wherein to determine, using the consistent hashing algorithm, the plurality of connection sessions with a plurality of network devices among the first plurality of network configuration controller, the processing circuitry is further configured to: determine, by each of the first plurality of network configuration controllers and using the consistent hashing algorithm, a corresponding non-overlapping portion of the plurality of connection sessions to maintain.

Example 14: The computing device of any of examples 12 and 13, wherein to determine, using the consistent hashing algorithm, the plurality of connection sessions with a plurality of network devices among the first plurality of network configuration controllers, the processing circuitry is further configured to: hash, by the first plurality of network configuration controllers, and using the consistent hashing algorithm, each of a plurality of device identifiers associated with the plurality of network devices to determine, for each of the plurality of network devices, a corresponding hash value; and distribute, by the first plurality of network configuration controllers, the plurality of connection sessions with a plurality of network devices among the first plurality of network configuration controllers based at least in part on the corresponding hash value of each of the plurality of network devices.

Example 15: The computing device of any of examples 12-14, wherein to determine, using the consistent hashing algorithm, the plurality of connection sessions with a plurality of network devices among the first plurality of network configuration controllers, the processing circuitry is further configured to: distribute, by the first plurality of network configuration controllers using a consistent hash ring, the plurality of connection sessions with a plurality of network devices among the first plurality of network configuration controllers.

Example 16: The computing device of any of examples 12-15, wherein to monitor the number of connection sessions maintained by each of the plurality of connection sessions, the processing circuitry is further configured to: periodically determine, by a timed task, the number of connection sessions maintained by each of the plurality of connection sessions.

Example 17: The computing device of any of examples 12-16, wherein to add, based on monitoring the number of connection sessions maintained by each of the first plurality of network configuration controllers, the additional network configuration controller to the first plurality of network configuration controllers, the processing circuitry is further configured to: determine whether to add the additional network configuration controller to the first plurality of network configuration controllers to form the second plurality of network configuration controllers based at least in part on comparing the number of connection sessions maintained by each of the first plurality of network configuration controllers is greater than a maximum number of connections that can be maintained by each of the first plurality of network configuration controllers.

Example 18: The computing device of example 17, wherein to determine whether to add the additional network configuration controller to the first plurality of network configuration controllers based at least in part on comparing the number of connection sessions maintained by each the first plurality of network configuration controllers is greater than a maximum number of connections that can be maintained by each of the first plurality of network configuration controllers, the processing circuitry is further configured to: determine whether the number of connection sessions maintained by at least one of the first plurality of network configuration controllers is greater than the maximum number of connections that can be maintained by each of the first plurality of network configuration controllers; and in response to determining that the number of connection sessions maintained by at least one of the first plurality of network configuration controllers is greater than the maximum number of connections that can be maintained by each of the first plurality of network configuration controllers, add the additional network configuration controller to the first plurality of network configuration controllers to form the second plurality of network configuration controllers.

Example 19: The computing device of any of examples 12-18, wherein to re-distribute, using the consistent hashing algorithm, the one or more connection sessions of the plurality of connection sessions among the second plurality of network configuration controllers, the processing circuitry is further configured to: determine, by each of the second plurality of network configuration controllers using the consistent hashing algorithm, a corresponding second non-overlapping portion of the plurality of connection sessions to maintain to re-distribute the one or more connection sessions of the plurality of connection sessions among the second plurality of network configuration controllers.

Example 20: A non-transitory computer-readable storage medium encoded with instructions that, when executed, cause one or more programmable processors to: distribute, by a first plurality of network configuration controllers and using a consistent hashing algorithm, a plurality of connection sessions with a plurality of network devices among the first plurality of network configuration controllers; monitor a number of connection sessions maintained by each of the first plurality of network configuration controllers; add, based on monitoring the number of connection sessions maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    distributing, by a first plurality of network configuration controllers of a controller and using a consistent hashing algorithm, a plurality of connection sessions with a plurality of network devices among the first plurality of network configuration controllers;
    monitoring, by the controller, a number of connection sessions maintained by each of the first plurality of network configuration controllers;
    adding, by the controller and in response to determining that the number of connection sessions maintained by at least one of the first plurality of network configuration controllers is greater than a maximum number of connections that can be maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distributing, by the second plurality of network configuration controllers and using the consistent hashing algorithm, one or more connection sessions of the plurality of connection sessions among the second plurality of network configuration controllers.

2. The method of claim 1, wherein distributing, using the consistent hashing algorithm, the plurality of connection sessions with a plurality of network devices among the first plurality of network configuration controllers further comprises:

determining, by each of the first plurality of network configuration controllers and using the consistent hashing algorithm, a corresponding non-overlapping portion of the plurality of connection sessions to maintain.

3. The method of claim 1, wherein distributing, using the consistent hashing algorithm, the plurality of connection sessions with a plurality of network devices among the first plurality of network configuration controllers further comprises:

hashing, by the first plurality of network configuration controllers of the controller, and using the consistent hashing algorithm, each of a plurality of device identifiers associated with the plurality of network devices to determine, for each of the plurality of network devices, a corresponding hash value; and distributing, by the first plurality of network configuration controllers of the controller, the plurality of connection sessions with a plurality of network devices among the first plurality of network configuration controllers based at least in part on the corresponding hash value of each of the plurality of network devices.

4. The method of claim 1, wherein distributing, using the consistent hashing algorithm, the plurality of connection sessions with a plurality of network devices among the first plurality of network configuration controllers further comprises:

distributing, by the first plurality of network configuration controllers of the controller using a consistent hash ring, the plurality of connection sessions with a plurality of network devices among the first plurality of network configuration controllers.

5. The method of claim 1, wherein monitoring the number of connection sessions maintained by each of the plurality of connection sessions further comprises:

periodically determining, by a timed task at the controller, the number of connection sessions maintained by each of the plurality of connection sessions.

6. The method of claim 1, wherein re-distributing, using the consistent hashing algorithm, the one or more connection sessions of the plurality of connection sessions among the second plurality of network configuration controllers further comprises:

determining, by each of the second plurality of network configuration controllers at the controller using the consistent hashing algorithm, a corresponding second non-overlapping portion of the plurality of connection sessions to maintain to re-distribute the one or more connection sessions of the plurality of connection sessions among the second plurality of network configuration controllers.

7. The method of claim 1, further comprising:

determining, by the controller, that a network configuration controller of the second plurality of network configuration controllers have stopped working; and in response to determining that the network configuration controller of the second plurality of network configuration controllers have stopped working, re-distributing, by the second plurality of network configuration controllers using the consistent hashing algorithm, the one or more connection sessions of the plurality of connection sessions among the second plurality of network configuration controllers.

8. The method of claim 7, wherein determining, by the controller, that the network configuration controller of the second plurality of network configuration controllers have stopped working further comprises:

periodically registering, by each of the second plurality of network configuration controllers, with the controller; and determining, by the controller, that the network configuration controller has failed to register with the controller.

9. The method of claim 1, wherein:

The first plurality of network configuration controllers and the second plurality of network configuration controllers comprise a plurality of Network Configuration Protocol (NETCONF) controllers; and the plurality of connection sessions comprise a plurality of NETCONF sessions.

10. A computing device comprising:

a memory; and processing circuitry in communication with the memory, the processing circuitry configured to:

distribute, by a first plurality of network configuration controllers and using a consistent hashing algorithm, a plurality of connection sessions with a plurality of network devices among the first plurality of network configuration controllers;

monitor a number of connection sessions maintained by each of the first plurality of network configuration controllers;

add, in response to determining that the number of connection sessions maintained by at least one of the first plurality of network configuration controllers is greater than a maximum number of connections that can be maintained by each of the first plurality of network configuration controllers, an additional network configuration controller to the first plurality of network configuration controllers to form a second plurality of network configuration controllers; and in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

11. The computing device of claim 10, wherein to determine, using the consistent hashing algorithm, the plurality of connection sessions with a plurality of network devices among the first plurality of network configuration controllers, the processing circuitry is further configured to:

determine, by each of the first plurality of network configuration controllers and using the consistent hashing algorithm, a corresponding non-overlapping portion of the plurality of connection sessions to maintain.

12. The computing device of claim 10, wherein to determine, using the consistent hashing algorithm, the plurality of connection sessions with a plurality of network devices among the first plurality of network configuration controllers, the processing circuitry is further configured to:
  hash, by the first plurality of network configuration controllers, and using the consistent hashing algorithm, each of a plurality of device identifiers associated with the plurality of network devices to determine, for each of the plurality of network devices, a corresponding hash value; and
  distribute, by the first plurality of network configuration controllers, the plurality of connection sessions with a plurality of network devices among the first plurality of network configuration controllers based at least in part on the corresponding hash value of each of the plurality of network devices.

13. The computing device of claim 10, wherein to determine, using the consistent hashing algorithm, the plurality of connection sessions with a plurality of network devices among the first plurality of network configuration controllers, the processing circuitry is further configured to:
  distribute, by the first plurality of network configuration controllers using a consistent hash ring, the plurality of connection sessions with a plurality of network devices among the first plurality of network configuration controllers.

14. The computing device of claim 10, wherein to monitor the number of connection sessions maintained by each of the plurality of connection sessions, the processing circuitry is further configured to:
  periodically determine, by a timed task, the number of connection sessions maintained by each of the plurality of connection sessions.

15. The computing device of claim 10, wherein to re-distribute, using the consistent hashing algorithm, the one or more connection sessions of the plurality of connection sessions among the second plurality of network configuration controllers, the processing circuitry is further configured to:
  determine, by each of the second plurality of network configuration controllers using the consistent hashing algorithm, a corresponding second non-overlapping portion of the plurality of connection sessions to maintain to re-distribute the one or more connection sessions of the plurality of connection sessions among the second plurality of network configuration controllers.

16. A non-transitory computer-readable storage medium encoded with instructions that, when executed, cause one or more programmable processors to:
  distribute, by a first plurality of network configuration controllers and using a consistent hashing algorithm, a plurality of connection sessions with a plurality of network devices among the first plurality of network configuration controllers;
  monitor a number of connection sessions maintained by each of the first plurality of network configuration controllers;
  add, in response to determining that the number of connection sessions maintained by at least one of the first plurality of network configuration controllers is greater than a maximum number of connections that can be maintained by each of the first plurality of network configuration controllers, an additional network configuration controller to the first plurality of network configuration controllers to form a second plurality of network configuration controllers; and
  in response to adding the additional network configuration controller to the first plurality of network configuration controllers, re-distribute, by the second plurality of network configuration controllers and using the consistent hashing algorithm, one or more connection sessions of the plurality of connection sessions among the second plurality of network configuration controllers.

* * * * *